US012750250B2

(12) United States Patent
Atfi et al.

(10) Patent No.: US 12,750,250 B2
(45) Date of Patent: Sep. 29, 2026

(54) AUTOMATED ASSET PREPARATION FOR A VIRTUAL MEETING

(71) Applicant: International Business Machines Corporation, Armonk, NY (US)

(72) Inventors: Mouad Atfi, Blainville (CA); Greg Pollack, Lakewood Ranch, FL (US); Zachary A. Silverstein, Georgetown, TX (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 18/383,257

(22) Filed: Oct. 24, 2023

(65) Prior Publication Data

US 2025/0132939 A1 Apr. 24, 2025

(51) Int. Cl.
*H04L 12/18* (2006.01)
*G06F 40/30* (2020.01)

(52) U.S. Cl.
CPC .......... *H04L 12/1822* (2013.01); *G06F 40/30* (2020.01)

(58) Field of Classification Search
CPC ............................. H04L 12/1822; G06F 40/30
See application file for complete search history.

(56) References Cited

U.S. PATENT DOCUMENTS 4,807,155 A 2/1989 Cree
6,002,915 A 12/1999 Shimizu
9,294,723 B2 3/2016 Seferian
9,622,059 B2 * 4/2017 Bouzid .............. G06Q 30/0631
10,510,051 B2 12/2019 Nelson
10,572,858 B2 2/2020 Nelson
12,166,631 B2 * 12/2024 Chubanov ........... H04L 41/0816
2001/0014867 A1 8/2001 Conmy
2003/0061087 A1 3/2003 Srimuang
2004/0111307 A1 6/2004 Demsky et al.
2005/0050061 A1 * 3/2005 Karstens ............. G06F 16/2358
2012/0293605 A1 * 11/2012 Seferian .............. H04L 65/1069 348/E7.083
2023/0421520 A1 * 12/2023 Gupta ................... G06F 40/186
2024/0056551 A1 * 2/2024 Kare .................. H04N 21/4788
(Continued)

FOREIGN PATENT DOCUMENTS

EP 3309730 A1 4/2018

OTHER PUBLICATIONS

"Meeting Agenda Software", Meeting Booster by MatchWare, 13 pps., © 2023 MeetingBooster.com, <https://www.meetingbooster.com/meeting-agenda-software>.
(Continued)

*Primary Examiner* — Joseph L Greene
(74) *Attorney, Agent, or Firm* — Joseph P. Curcuru

(57) ABSTRACT

Provided is a method, system, and computer program product for automatically identifying and preparing assets needed for a virtual meeting using artificial intelligence. A processor may receive a set of communications associated with an upcoming virtual meeting. The processor may analyze, using natural language processing, the set of communications to identify one or more assets to be loaded for the upcoming virtual meeting. The processor may load the one or more assets on a computing device that will be presenting the one or more assets during the upcoming virtual meeting.

20 Claims, 5 Drawing Sheets

(56) References Cited

U.S. PATENT DOCUMENTS

| | | | | |
|---|---|---|---|---|
| 2024/0282314 | A1* | 8/2024 | Griffin | H04L 12/1822 |
| 2025/0023930 | A1* | 1/2025 | Shin | G06Q 10/10 |

OTHER PUBLICATIONS

"Remote meeting agenda and meeting minutes app", Tadum, © 2019-2023 Code and Effect, 5 pps, <https://tadum.app/>.
He et al. "Preference of negotiation styles of employees based on cultural differences: a case study." Leveraging global competitiveness for organizational excellence: Handbook of management cases (2010): 258-267.
No Author, "Meeting Preparation", https://web.archive.org/web/20211019150726/https://www.meetingbooster.com/meeting-preparation.php, dated May 9, 2025, 3 pages.

* cited by examiner

AUTOMATED ASSET PREPARATION FOR A VIRTUAL MEETING

BACKGROUND

The present disclosure relates generally to the field of artificial intelligence and, more specifically, to collecting electronic communications regarding an upcoming virtual meeting or event and utilizing natural language processing (NLP) to assess the collected communications to extract required computing assets (e.g., software, presentation tools, files, documents, etc.) for pre-loading to be ready for use upon initiation of (or during) the virtual meeting/event.

Many professionals participate in virtual meetings as part of their employment duties. Typically, presenters in the virtual meeting may require various computing assets to be used during their presentation. For example, meeting participants may be required to have computing assets such as documents, presentation materials, various demonstration software, and the like opened and operating on one or more meeting participant's respective user device during the virtual meeting.

SUMMARY

Embodiments of the present disclosure include a computer-implemented method, system, and computer program product for automatically identifying and loading computing assets needed for a virtual meeting using artificial intelligence. A processor may receive a set of communications associated with an upcoming virtual meeting. The processor may analyze, using natural language processing, the set of communications to identify one or more assets to be loaded for the upcoming virtual meeting. The processor may load the one or more assets on a computing device that will be presenting the one or more assets during the upcoming virtual meeting.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
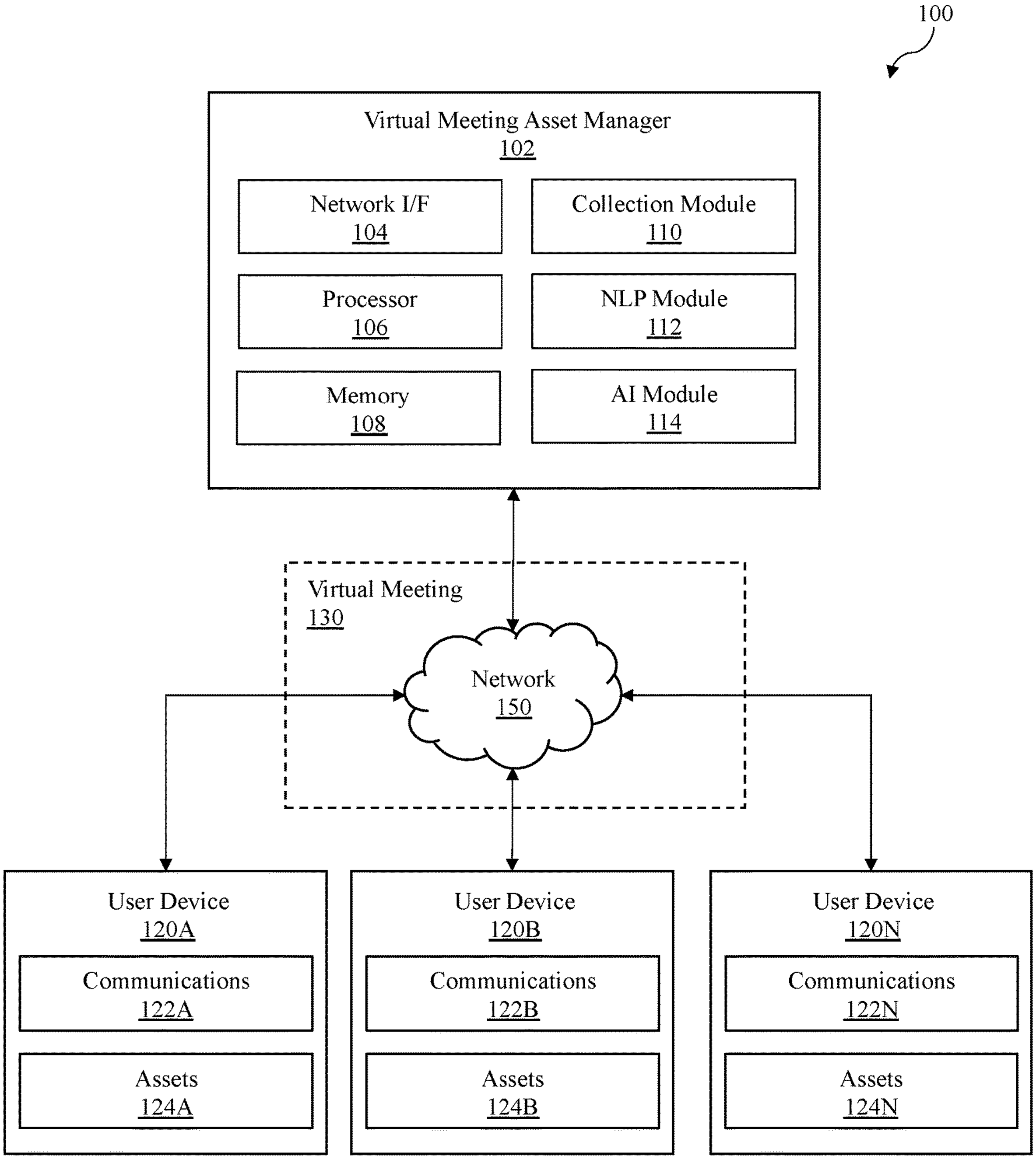
FIG. 1 illustrates a block diagram of an example virtual meeting asset management system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of artificial intelligence and, more particularly, to collecting electronic communications regarding an upcoming virtual meeting or event and utilizing natural language processing (NLP) to assess the collected communications to extract required computing assets (e.g., software, presentation tools, files, documents, virtual machines, etc.) for pre-loading to be ready for use upon initiation of (or during) the virtual meeting/event. While the present disclosure is not necessarily limited to such applications, various aspects of the disclosure may be appreciated through a discussion of various examples using this context.

Many professionals participate in virtual meetings as part of their employment duties. Typically, presenters in the virtual meeting may require various computing assets to be used during their presentation. For example, meeting participants may be required to have computing assets such as documents, presentation materials, various demonstration software, and the like opened and operating on one or more of the meeting participant's respective user device during the virtual meeting.

Often professionals experience back-to-back virtual meetings and do not have time to prepare for the next. In many instances, the first few minutes of a virtual meeting are spent gathering and/or opening computing assets or materials, ensuring that each person is referring to the same document, or trying to load required software for a productive session. This is important time unnecessarily spent on cost-adding activities, not value-add. A more efficient way to derive the meeting agenda, objectives, related materials and required assets is needed so meetings immediately begin effectively with each participant prepared to engage and deliver.

Embodiments of the present disclosure provide a system, method, and computer program product for automated asset preparation for a virtual meeting. The system will capture communications surrounding a virtual meeting or event, and utilize NLP processing regarding the discussion between parties of the communications to extract relevant assets (e.g., software applications, files, documents, presentation tools, etc.) for pre-loading to be ready upon initiation and/or during the virtual meeting or event. In this way, virtual meeting efficiencies can be significant improved by reducing time wasted when manually loading assets at the start of the meeting which has become a ubiquitous problem.

In embodiments, a virtual meeting asset manager may receive/collect a set of communications associated with an upcoming virtual meeting. For example, the virtual meeting asset manager may collect/receive various communications such as email correspondence, text messages, direct messages, and/or calendar messages from various communication applications on a one or more user devices. The communications may include various relevant discussions regarding one or more upcoming virtual meetings and various assets that may be required during the meeting.

In some embodiments, the virtual meeting asset manager may receive an identification of the upcoming virtual meeting that may be used to initiate collecting of the set of communications. For example, the virtual meeting asset manager may receive a notification that a virtual meeting has been scheduled (e.g., through a calendar event/meeting notification). The notification may include various characteristics associated with the upcoming virtual meeting. For example, the characteristics may include meeting start times, participant lists, meeting agenda with various presentation time slots per participant, the virtual meeting's host application software type, and the like. Using the virtual meeting notification and characteristics, the virtual meeting asset manager can initiate analysis of a corpus of communications in order to identify the set of communications associated with upcoming virtual meeting. This allows the virtual meeting asset manager to identify relevant conversations from the corpus regarding the given virtual meeting.

In embodiments, the virtual meeting asset manager may analyze, using natural language processing (NLP), the set of communications to identify one or more assets to be loaded for the upcoming virtual meeting. For example, the virtual meeting asset manager may user various NLP/machine learning algorithms to extract and/or associate assets discussed in the communications with the identified upcoming virtual meeting. For example, algorithms may be used to identify associations using clustering such as k-means based on discussion context and use that context to extract out relevant assets, or applications of importance for the virtual meeting. For example, a first user and a second user may be discussing, in a direct messaging program, which presentation file version to use for their upcoming virtual meeting, where one of the users identifies the presentation file, presentation tool, and/or presentation dashboard. The virtual meeting asset manager will extract and identify the relevant assets (presentation file, tool, and dashboard) from the communications as required assets for the upcoming virtual meeting. As would be recognized by one of ordinary skill in the art, other assets, context, and/or features may be extracted depending on the user(s) and their communications, and the examples given herein should not be construed as limiting.

In embodiments, the virtual meeting asset manager may automatically load the one or more assets on the given computing device that will be presenting the one or more assets during the upcoming virtual meeting. For example, based on the analyzed communications, the virtual meeting asset manager may load the relevant assets on the first user's computing device because the first user was determined to be the presenter based on context extracted from the communications. Returning to the example above, the presentation file, presentation software, presentation dashboard, will be loaded (pre-loaded) automatically for the upcoming virtual meeting, in addition to the hosting software for virtual meeting. In this way, users participating in the virtual meeting will not be waiting while the presenter is taking up value meeting time to manually load the assets or connect to the virtual meeting.

In some embodiments, the virtual meeting asset manager may load the asset(s) automatically on the computing device when the upcoming virtual meeting initiates, automatically on the computing device at a predetermined time period prior to initiation of the virtual meeting, or at a predetermined time during the virtual meeting based on the context of the analyzed communications. For example, a first user may be the first presenter of the virtual meeting and based on preferences, want the assets for the given meeting to be loaded 5 minutes prior to the start of the meeting (e.g., so they can be prepared), or after a 5-minute introduction by the presenter of the meeting (to prevent application time out). In this way, the virtual meeting asset manager may load the given asset(s) based on user preference.

Further, depending on various other virtual meeting characteristics obtained from communications (e.g., meeting times, meeting type, participants, presentation slots, etc.) the virtual meeting asset manager may identify other assets and/or computing devices (e.g., participant devices) that will be required for the upcoming meeting. For example, based on the NLP analysis of the set of communications, the virtual meeting asset manager may determine that additional assets (e.g., a second presentation, a second file, or second application) may be required to be pre-loaded on the second user's computing device since they will be presenting in the virtual meeting at a predetermined time period (e.g., based on extracted time slot information regarding the virtual meeting).

In some embodiments, the virtual meeting manager may automatically load and/or display a given asset on the computing device that is designated for screen sharing during the virtual meeting. For example, based on the analyzed communications, the virtual meeting manager may determine that a first user will be presenting a slide deck at the beginning of the virtual meeting and automatically load the given assets (e.g., presentation slide deck, presentation software, demonstration software, etc.) on the first user's computing device. The virtual meeting manager may then load a second asset on a second user's computing device at the predetermined time based on the analyzed communications.

In some embodiments, the virtual meeting asset manager may analyze, using NLP, a second set of communications generated during the virtual meeting to identify a second asset to be loaded on the computing device or a second computing device attending the virtual meeting. For example, current conversations (e.g., audible conversation of the meeting converted using speech to text and/or textual conversations) may be analyzed during the meeting using NLP, such that any contextual content regarding using further assets may be identified and used to preload additional assets. For example, a participant may state during the virtual meeting that "we need the second user to open program A." The virtual meeting asset manager will analyze the current communication and determine that program A is a second asset to be opened by the second user. Once the second asset is determined, the virtual meeting asset manager may preload the second asset automatically on the second computing device based on the contextual content. In this way, during the virtual meeting, the second user may be asked to present something using another asset (e.g., a demo application on a virtual machine), and the virtual meeting asset manager will automatically pre-loaded the asset in order to reduce time waste.

In some embodiments, the virtual meeting asset manager may analyze, prior to loading the one or more assets, a performance state of the computing device(s) that will be used for presenting during the virtual meeting. For example, the virtual meeting asset manager may analyze the performance state of the hardware and/or software operations on the computing device to determine if it is adequate to load the assets on the given device. Based on the analysis, the virtual meeting asset manager may generate a performance state score for the computing device. The score will be indicative of the respective computing device(s)'s ability to maintain the presentation/operation of assets during the virtual meeting. For example, the performance state score may include a confidence value regarding using the asset on the given computing device without interruption due to system health, hardware, bandwidth, time outs, etc.

The virtual meeting asset manager may compare the performance state score to a predetermined threshold, where if the predetermined threshold is met, the one or more assets are loaded on the computing device. If the predetermined threshold is not met, the virtual meeting asset manager may perform alternative actions regarding the computing device. For example, the virtual meeting asset manager may attempt to load the asset on a second computing device participating in the virtual meeting that has a performance state that meets the predetermined threshold. In another example, the virtual meeting asset manager may close various applications and/or software that may increase the performance state score of the computing device in order to meet the threshold. In this way, if a computing device's hardware/software operations are not capable of loading various types of assets (e.g., complex demonstration software via a virtual machine), then the virtual meeting asset manager will either not load the asset or look for an alternative device for loading to reduce inefficiencies of the virtual meeting.

In some embodiments, the virtual meeting asset manager may generate a confidence score related to communications requesting possible assets for an upcoming virtual meeting or during the virtual meeting. For example, a communication or discussion between users may indicate that a first user "might" need a second user to present an asset during the upcoming virtual meeting. The virtual meeting asset manager may generate a confidence score based on the analysis of the discussion. The confidence score may be adjusted based on additional communications. For example, the first user may indicate that they only need the second user to present the asset if they are absent from the meeting. In such a scenario, if the first user is not present on the participation list during initiation of the virtual meeting or if further communications indicate the first user will miss the meeting, then the confidence score would be increased, and the virtual meeting asset manager would automatically load the asset on the second user's device for the virtual meeting.

In embodiments, the user(s) must opt into the system in order for the virtual meeting asset manager to collect, receive, monitor, and/or use their information (e.g., collecting communications, monitoring communications during virtual meetings, etc.) for making automated asset determinations. The user may determine which other users (e.g., third party user or entity, second users, etc.) can access the collected, monitored, and/or generated data. For example, during an initialization process, the system may inform the user of the types of data that it will collect (e.g., emails, direct messages, text messages, calendar notifications, etc.) and the reasons why the data is being collected. In these embodiments, the system will only start collecting the user information upon the user explicitly permitting the collection. Furthermore, the system may only collect the data that is necessary to for asset determination (e.g., respective assets needed for a specific virtual meeting only). The data may be anonymized and/or encrypted while in use, and the data may only be maintained as needed for providing necessary actions. If the user chooses to opt out of the system, any user information previously collected may be permanently deleted.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example virtual meeting asset management system 100, in accordance with embodiments of the present disclosure. In the illustrated embodiment, virtual meeting asset management system 100 includes virtual meeting asset manager 102 that is communicatively coupled to user device 120A, user device 120B, and user device 120N (collectively referred to user devices 120) via network 150. Virtual meeting asset manager 102 and user devices 120 may be configured as any type of computer system and may be substantially similar to computer system 401 of FIG. 4. In some embodiments, virtual meeting asset manager 102 and user devices 120 may be configured as separate standalone systems that communicate over network 150 or as one or more integrated system. For example, virtual meeting asset manager 102 may be a separate computing device or application that communicates over a cloud computing network with a user's smartphone, laptop, tablet, etc. (e.g., user devices 120). In some embodiments, virtual meeting asset manager 102 may be included on user devices 120 (e.g., virtualized application on a user interface).

In embodiments, network 150 may be any type of communication network, such as a wireless network or a cloud computing network. Network 150 may be substantially similar to, or the same as, a computing environment 500 described in FIG. 5. In some embodiments, network 150 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150. In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, virtual meeting asset manager 102 may communicate with user devices 120 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments, virtual meeting asset manager 102 may communicate with user device 120A using a hardwired connection, while communication between user device 120B, user device 120N, and virtual meeting asset manager 102 may be through a wireless communication network.

In embodiments, user devices 120 may be any type of communication devices (e.g., a computer, smartphone, tablet, laptop, etc.) that include software and hardware capable of interacting in virtual meeting 130. In the illustrated embodiment, user devices 120 include communications 122 and assets 124. Communications 122 may include any type of electronic communications that the virtual meeting asset manager 102 can extract contextual data to for making predications/determination regarding required assets needed for virtual meeting 130. For example, communications 122 may include various electronic communications (e.g., emails, direct messaging, text messages, calendar messages, etc.) between users regarding an upcoming virtual meeting 130. Assets 124 may include any type of computing assets that will be used prior to or during the virtual meeting 130. For example, assets 124 may include various software applications, presentation materials, demonstration applications, documents, files, etc. It is contemplated that other types of communications 122 and assets 124 may be used while maintaining the scope of the present disclosure, therefore, this list is not to meant to be limiting. In some embodiments, user devices 120 may include some or similar components (e.g., processor, memory, network I/F, natural language processing (NLP) module, etc.) as virtual meeting asset manager 102, but for brevity purposes these components are not shown. In some embodiments, additional sensors for collecting and/or monitoring communications regarding assets required for the virtual meeting 130 may be separate from the user device. For example, Internet of Things (IoT) devices (e.g., smart cameras, smart speakers, etc.) that include various sensors may be configured to collect additional communication data that may be analyzed by the virtual meeting asset manager 102 to make asset determinations. Although not shown, these IoT devices may be configured to interacted with user devices 120 over network 150.

In the illustrated embodiment, virtual meeting asset manager 102 includes network interface (I/F) 104, processor 106, memory 108, collection module 110, natural language processing (NLP) 112, and machine learning (ML) module 114. In embodiments, a user may install and/or allow the virtual meeting manager to access communications 122 and/or execute commands on their given user device(s) 120.

In embodiments, collection module 110 is configured to collect and/or monitor communications 122 may by users from user devices 120. For example, collection module 110 may collect communications 122 between users discussing various assets needed for an upcoming virtual meeting 130 and/or during a current virtual meeting 130. In some embodiments, the collection module 110 may collect user calendar information (e.g., calendar invites, notification, etc.) to identify the upcoming virtual meeting 130.

In embodiments, NLP module 112 analyzes the communications 122 gathered by the collection module 110 to determine the contextual constraints of virtual meeting 130. For example, NLP module 112 may identify from the communications 122 that certain assets 124 are required to be preloaded or loaded during the virtual meeting 130. Once the required assets 124 are identified, the virtual meeting asset manager 102 will load the one or more identified assets on the one or more of the given user devices 120. The NLP module 112 may use various machine learning algorithms (e.g., KNN and co-sine similarity) to process the discussion/communication/calendar information between users to identify relevant content (e.g., context related to participants, meeting time/date, and/or specific assets such as files or applications to be used) associated with an upcoming virtual meeting 130. The NLP module 112 may identify the virtual meeting 130 based on explicit text (e.g., "the meeting is at 4:30 pm"), implicit text (e.g., "the meeting with Joe is coming up") and/or via calendar information. The NLP module 112 may cross check the user(s)'s calendar and any contextual/keywords associated with the virtual meeting 130 to identify required assets. For example, the NLP module 112 may identify context or keywords surrounding specific files or applications mentioned in the communications. For example, a first user may ask a second user "Can you launch program A?" or "share the quarterly results" in the upcoming meeting. Using this context, the NLP module 112 can identify that program A and/or the quarterly results file needs to be preloaded or available during the virtual meeting 130. In some embodiments, the NLP module 112 may do a deep file inspection comparison based on the context of the communication (e.g., locating the proper/most recent versions of the files or application based on the communication).

In embodiments, artificial intelligence (AI) module 114 may collect, monitor, and/or analyze various data (communications data, scoring data, metadata, historical application data, boot times, etc.) related to the virtual meeting asset management system 100. Using the various data, the AI module 114 may improve various efficiencies of the virtual meeting asset manager 102. For example, the AI module 114 may perform an efficiency analysis on historical application data and system logs to determine standard boot times and/or filing location times based on various metadata/access data to a given asset. Using these times, the AI module 114 may predict/determine appropriate preloading times for the given asset(s) in relation to the asset(s)'s need during the virtual meeting 130. For example, based on the efficiency analysis, the AI module 114 may preload an application asset that takes roughly 5 minutes to load, 5 minutes prior to the start of the virtual meeting 130 or, alternatively, a second asset that loads quickly may be loaded when the asset is mentioned during the meeting. The AI module 114 may proactively open a file or folder on the user's device that may be approaching the determined boot time threshold. In this way, the AI module 114 may dynamically adjust asset load times based on loading efficiency to not only reduce wait times, but reduce using computing resources for different assets.

In some embodiments, the AI module 114 may be configured to analyze the system health of a given user device 120 to determine if the computing device is stable enough to present the asset. The AI module 114 may determine the performance state of the user device 120 and generate a performance state score. The AI module 114 may compare the performance state score to a predetermined threshold, wherein if the predetermined threshold is met, the one or more assets are loaded on the computing device. If the predetermined threshold is not met, the virtual meeting asset manager may perform alternative actions such as loading the asset on a second user device participating in the virtual meeting 130 or closing various applications and/or software that may increase the performance state score of the given device in order to meet the threshold.

In some embodiments, AI module 114 can utilize machine learning and/or deep learning, where algorithms or models can be generated by performing supervised, unsupervised, or semi-supervised training. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of virtual meeting asset management system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with virtual meeting asset management system 100 may not be present, and the arrangement of components may vary. For example, while FIG. 1 illustrates an example virtual meeting asset management system 100 having a single virtual meeting asset manager 102 and three user devices 120 that are communicatively coupled via a single network 150, suitable network architectures for implementing embodiments of this disclosure may include any number of virtual meeting asset managers, user devices, and networks. The various models, modules, systems, and components illustrated in FIG. 1 may exist, if at all, across a plurality of virtual meeting asset managers, user devices, and networks.

Figure 2:
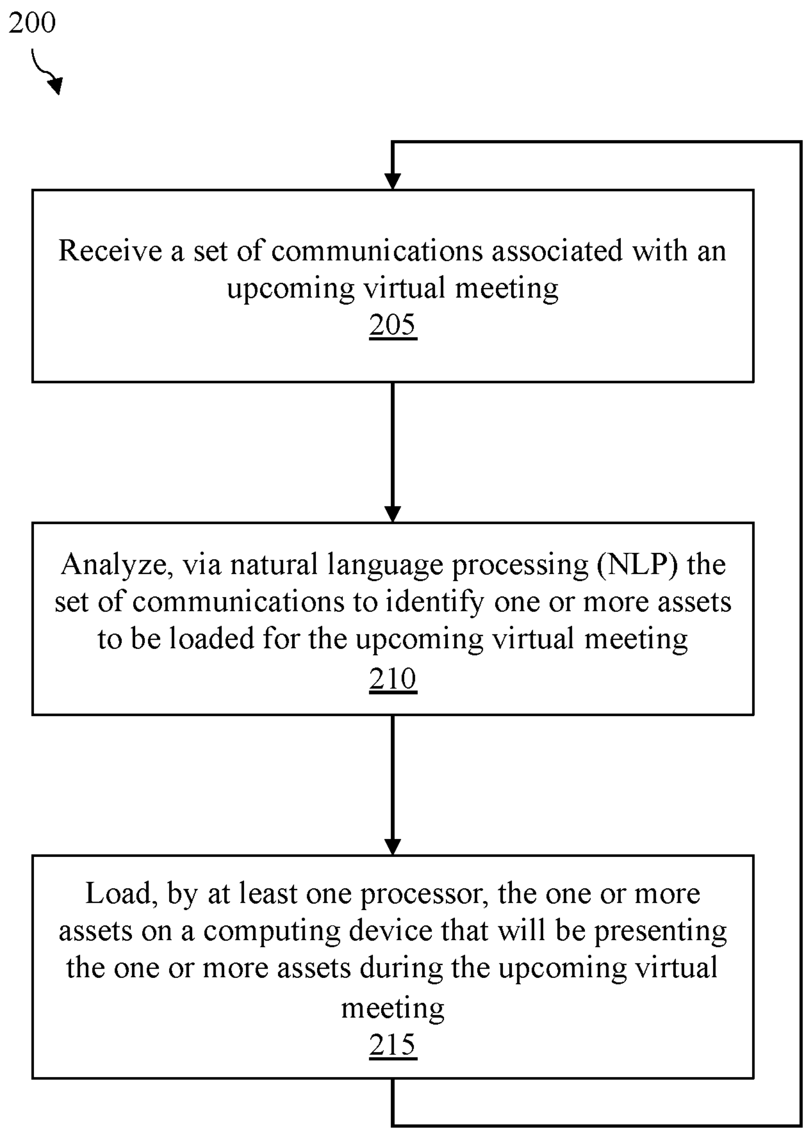
FIG. 2 illustrates a flow diagram of an example process for automated asset preparation for a virtual meeting, in accordance with embodiments of the present disclosure.

Referring now to FIG. 2, shown is a flow diagram of an example process 200 for automated asset preparation for a virtual meeting, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. In embodiments, process 200 may be performed by processor 106 of virtual meeting asset manager 102 of FIG. 1. The process 200 may be performed prior to or during a virtual meeting (e.g., virtual meeting 130) that is presented to one or more users via a user device (e.g., smartphone, laptop, tablet, computer, etc.). The user device may be configured as one of user devices 120 of FIG. 1.

In embodiments, process 200 begins by receiving a set of communications associated with an upcoming virtual meeting. This is shown at step 205. In embodiments, the set of communications comprises one or more communications such as email correspondence, text messages, direct messages, and calendar messages, however, this list is not meant to be limiting.

In some embodiments, the virtual meeting asset manager may receive an identification of the upcoming virtual meeting that may be used to initiate collecting of the set of communications. For example, the virtual meeting asset manager may receive a notification that a virtual meeting has been scheduled (e.g., through a calendar event/meeting notification). The notification may include various characteristics associated with the upcoming virtual meeting. For example, the characteristics may include meeting start times, participant lists, meeting agenda with various presentation time slots per participant, the virtual meeting's host application software type, and the like. Using the virtual meeting notification and characteristics, the virtual meeting asset manager can initiate analysis of a corpus of communications in order to identify the set of communications associated with upcoming virtual meeting. This allows the virtual meeting asset manager to identify relevant conversations from the corpus regarding the given virtual meeting.

In embodiments, the process 200 continues by analyzing, via natural language processing (NLP), the set of communications to identify one or more assets to be loaded for the upcoming virtual meeting. This is shown at step 210. In embodiments, the one or more assets comprise one or more asset types such as software applications, computer models, documents, and/or files, however, this list is not meant to be limiting. For example, the virtual meeting asset manager may user various NLP/machine learning algorithms to extract and/or associate assets discussed in the communications with the identified upcoming virtual meeting. For example, a first user and a second user may be discussing, in a direct messaging program, which presentation file version to use for their upcoming virtual meeting, where one of the users identifies the presentation file, presentation tool, and/or presentation dashboard. The virtual meeting asset manager will extract and identify the relevant assets (presentation file, tool, and dashboard) from the communications as required assets for the upcoming virtual meeting.

In embodiments, the process 200 continues by loading, by at least one processor, the one or more assets on a computing device that will be presenting the one or more assets during the upcoming virtual meeting. This is shown at step 215. For example, based on the analyzed communications, the virtual meeting asset manager may load the relevant assets on the first user's computing device because they were determined to be the presenter based on context extracted from the communications. Returning to the example above, the presentation file, presentation software, presentation dashboard, will be loaded (pre-loaded) automatically for the upcoming virtual meeting, in addition to the hosting software for virtual meeting. In this way, users participating in the virtual meeting will not be waiting while the presenter is taking up value meeting time to load the assets.

In some embodiments, the one or more assets are loaded automatically on the computing device when the upcoming virtual meeting initiates. In some embodiments, the one or more assets are loaded automatically on the computing device at a predetermined time period prior to initiation of the virtual meeting. In some embodiments, at least one asset of the one or more assets loaded on the computing devices is automatically displayed on the computing device that is designated for screen sharing during the virtual meeting.

In some embodiments, the process 200 may further include determining that a first asset of the one or more assets is needed at a first predetermined time period after the virtual meeting initiates; and loading, by the at least one processor, the first asset at the first predetermined time period after the virtual meeting initiates. For example, based on the analyzed communications, the virtual meeting manager may determine that a first user will be presenting a slide deck at the beginning of the virtual meeting and automatically load the given assets (e.g., presentation slide deck, presentation software, demonstration software, etc.) on the first user's computing device. The virtual meeting manager may load a second asset on a second user's computing device at a predetermined time based on the analyzed communications.

In some embodiments, the process 200 may further include analyzing, using NLP, a second set of communications generated during the virtual meeting to identify a second asset to be loaded on the computing device or a second computing device attending the virtual meeting. Once identified, the process 200 may further include loading, by the at least one processor, the second asset on either the computing device or the second computing device. For example, current conversations (e.g., audible conversation of the meeting analyzed using speech to text and/or textual conversations) may be analyzed during the meeting using NLP, such that any contextual content regarding using further relevant assets may be identified and used to preload additional assets.

In embodiments, once the virtual meeting is completed, the process 200 may return to step 205 in order to receive/collect further communications regarding other virtual meetings. In this way, the automated process continually predicts which assets are required for or during any upcoming virtual meetings.

Figure 3:
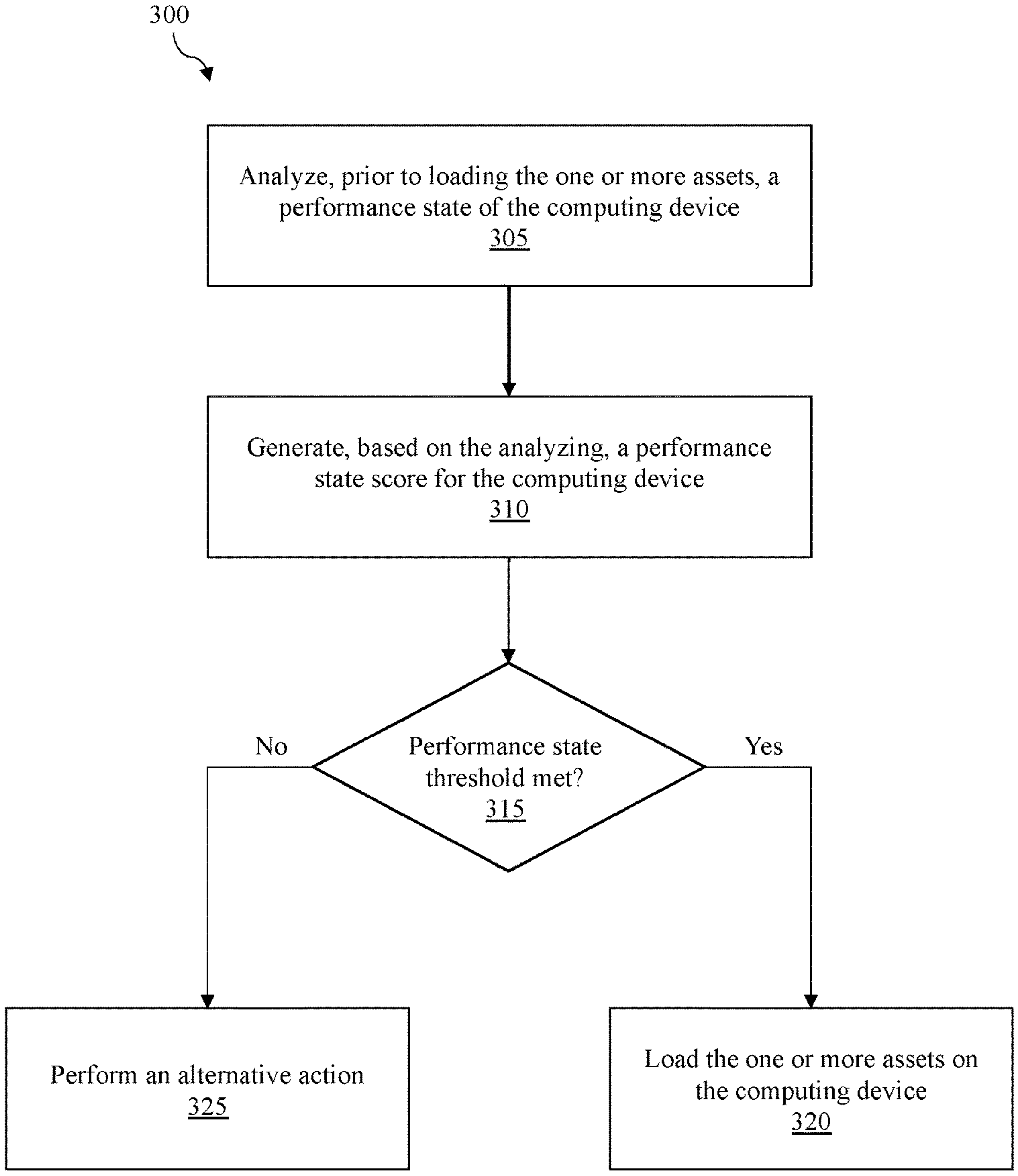
FIG. 3 illustrates a flow diagram of an example process for assessing a performance state of a computing device, in accordance with embodiments of the present disclosure.

Referring now to FIG. 3, shown is a flow diagram of an example process 300 for assessing a performance state of a computing device, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, process 300 is in addition to or a sub-process of process 200. In some embodiments, the process 300 is a computer-implemented process. In embodiments, process 300 may be performed by processor 106 of virtual meeting asset manager 102 of FIG. 1. The process 300 may be performed prior to and/or during a virtual meeting that is presented to one or more users via a user device (e.g., smartphone, laptop, tablet, computer, etc.). The user device may be configured as one of user devices 120 of FIG. 1.

In embodiments, process 300 begins by analyzing, prior to loading the one or more assets, a performance state of the computing device(s) that will be used for presenting during the virtual meeting. This is shown at step 305. For example, the virtual meeting asset manager may analyze the performance state of the hardware and/or software operations on the computing device to determine if it is adequate to load the assets on the given device.

In embodiments, the process 300 continues by generating a performance state score for the given computing device. This is shown at step 310. The performance state score is indicative of the respective computing device(s)'s ability to maintain the presentation/operation of assets during the virtual meeting. For example, the performance state score may include a confidence value regarding using the asset on the given computing device without interruption due to system health, hardware, bandwidth, time outs, etc.

In embodiments, the process 300 continues by comparing the performance state score to a predetermined performance state threshold. This is shown at step 315. If "Yes" at step 315, the process 300 continues by loading the one or more assets on the computing device. This is shown at step 320. If "No" at step 315, the process 300 continues by performing an alternative action. This is shown at step 325. For example, the virtual meeting asset manager may perform alternative actions such as loading the asset on a second computer participating in the virtual meeting that has a performance state that meets the predetermined threshold. In another example, the virtual meeting asset manager may close various applications and/or software that may increase the performance state score in order to meet the threshold. In this way, if a computing device's hardware/software operations are not capable of loading various types of assets (e.g., complex demonstration software via a virtual machine), then the virtual meeting asset manager will either not load the asset or look for an alternative device for load to reduce inefficiencies of the virtual meeting.

Figure 4:
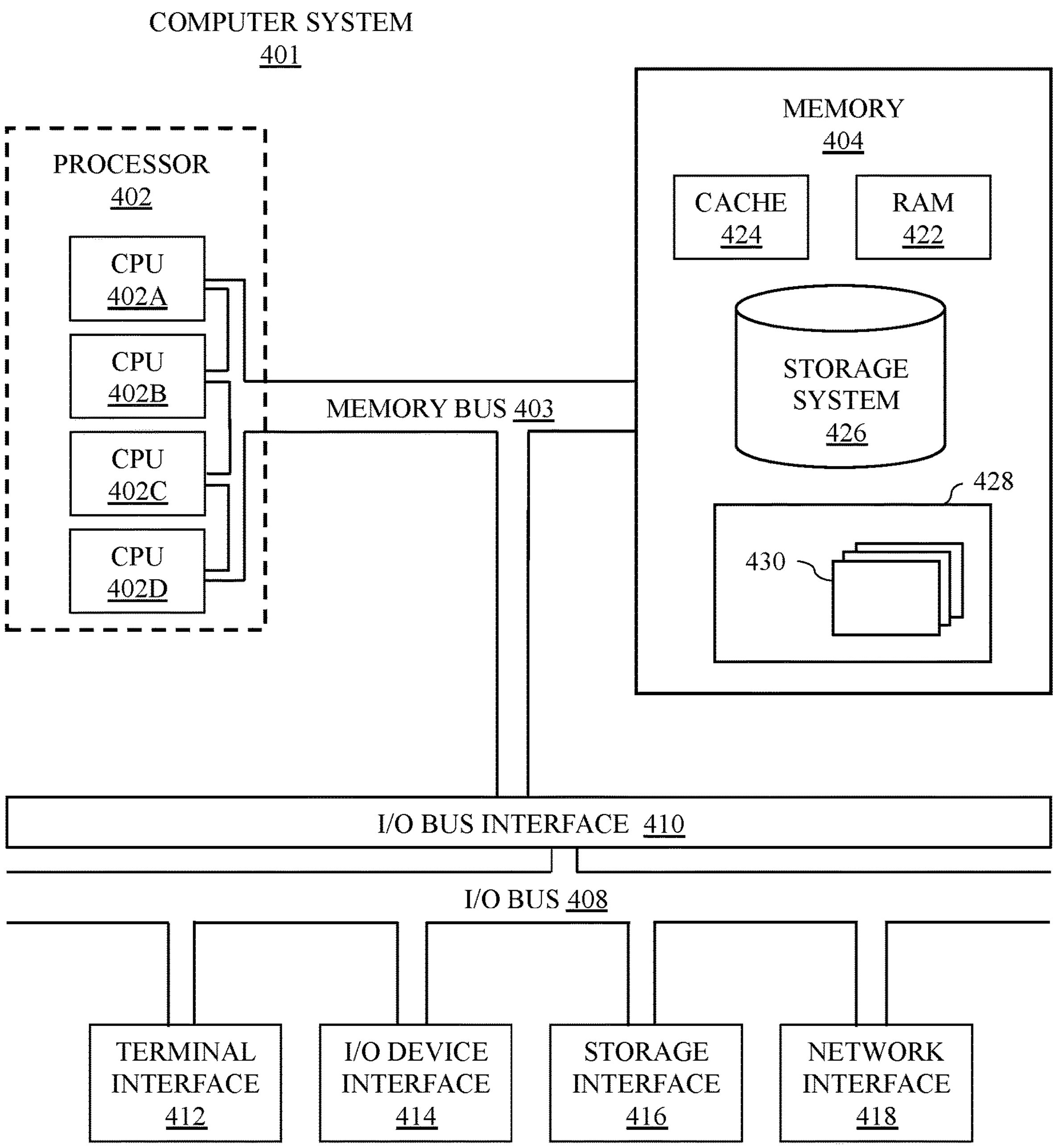
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache. In some embodiments, a processor can include at least one or more of, a memory controller, and/or storage controller. In some embodiments, the CPU can execute the processes included herein (e.g., process 200 and 300 as described in FIG. 2 and FIG. 3, respectively). In some embodiments, the computer system 401 may be configured as virtual meeting asset management system 100, virtual meeting asset manager 102, and/or user devices 120 of FIG. 1.

System memory subsystem 404 may include computer system readable media in the form of volatile memory, such as random-access memory (RAM) 422 or cache memory 424. Computer system 401 may further include other removable/non-removable, volatile/non-volatile computer system data storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 404 can include flash memory, e.g., a flash memory stick drive or a flash drive. Memory devices can be connected to memory bus 403 by one or more data media interfaces. The memory subsystem 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single units, the computer system 401 may, in some embodiments, contain multiple I/O bus interfaces 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory subsystem 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 428 and/or program modules 430 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
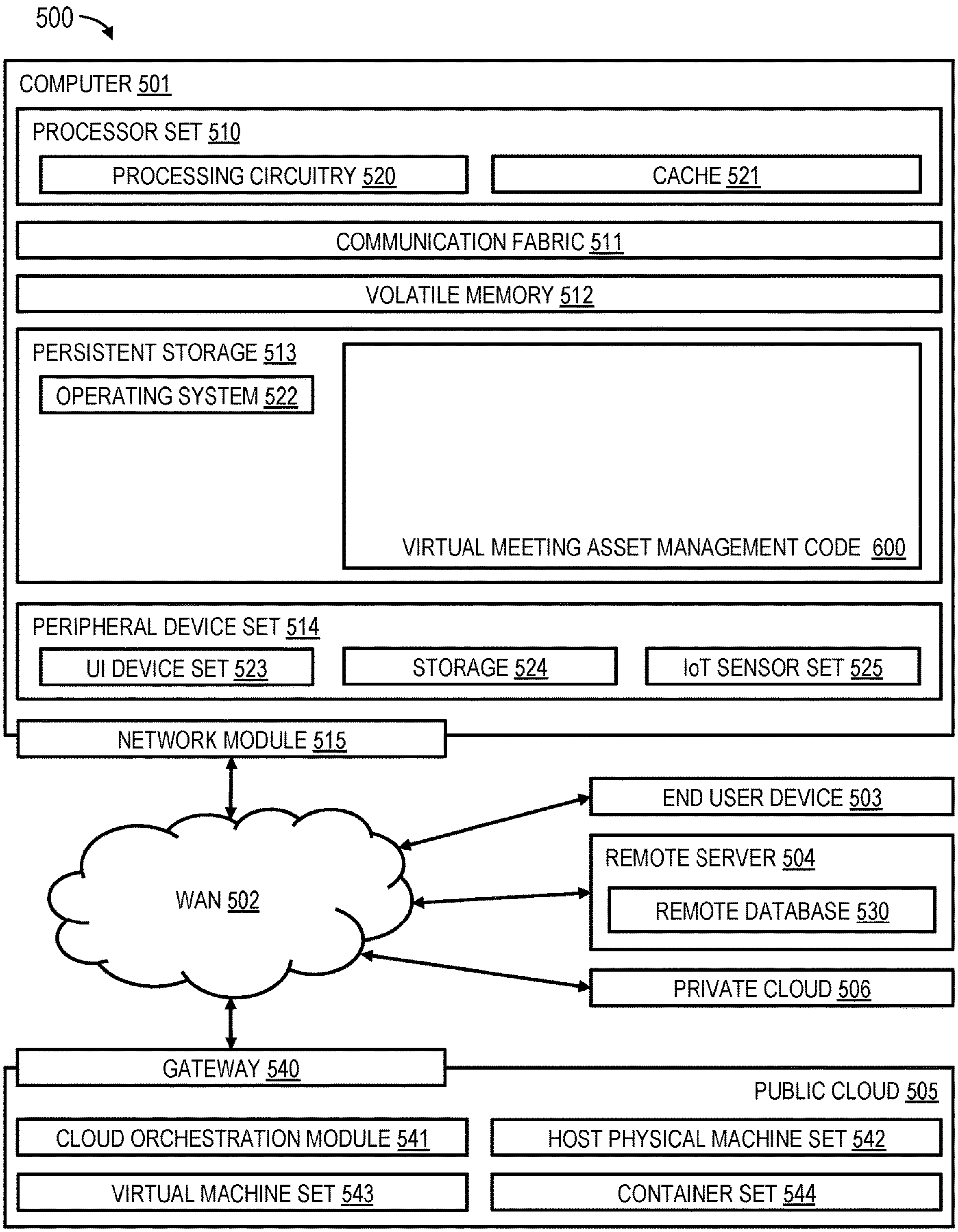
FIG. 5 depicts a schematic diagram of a computing environment for executing program code related to methods for automated asset preparation for a virtual meeting as disclosed herein, according to at least one embodiment.

Embodiments of the present disclosure may be implemented together with virtually any type of computer, regardless of the platform is suitable for storing and/or executing program code. FIG. 5 shows, as an example, a computing environment 500 (e.g., cloud computing system) suitable for executing program code related to the methods disclosed herein and for virtual meeting asset management. In some embodiments, the computing environment 500 may be the same as or an implementation of the computing environment 100.

Computing environment 500 contains an example of an environment for the execution of at least some of the computer code involved in performing the inventive methods, such as virtual meeting asset management code 600. The virtual meeting asset management code 600 may be a code-based implementation of the virtual meeting asset management system 100. In addition to virtual meeting asset management code 600, computing environment 500 includes, for example, a computer 501, a wide area network (WAN) 502, an end user device (EUD) 503, a remote server 504, a public cloud 505, and a private cloud 506. In this embodiment, the computer 501 includes a processor set 510 (including processing circuitry 520 and a cache 521), a communication fabric 511, a volatile memory 512, a persistent storage 513 (including operating a system 522 and the virtual meeting asset management code 600, as identified above), a peripheral device set 514 (including a user interface (UI) device set 523, storage 524, and an Internet of Things (IoT) sensor set 525), and a network module 515. The remote server 504 includes a remote database 530. The public cloud 505 includes a gateway 540, a cloud orchestration module 541, a host physical machine set 542, a virtual machine set 543, and a container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 530. As is well understood in the art of computer technology, and depending upon the technology, performance of a computer-implemented method may be distributed among multiple computers and/or between multiple locations. On the other hand, in this presentation of the computing environment 500, detailed discussion is focused on a single computer, specifically the computer 501, to keep the presentation as simple as possible. The computer 501 may be located in a cloud, even though it is not shown in a cloud in FIG. 5. On the other hand, the computer 501 is not required to be in a cloud except to any extent as may be affirmatively indicated.

The processor set 510 includes one, or more, computer processors of any type now known or to be developed in the future. The processing circuitry 520 may be distributed over multiple packages, for example, multiple, coordinated integrated circuit chips. The processing circuitry 520 may implement multiple processor threads and/or multiple processor cores. The cache 521 is memory that is located in the processor chip package(s) and is typically used for data or code that should be available for rapid access by the threads or cores running on the processor set 510. Cache memories are typically organized into multiple levels depending upon relative proximity to the processing circuitry. Alternatively, some, or all, of the cache for the processor set may be located "off chip." In some computing environments, the processor set 510 may be designed for working with qubits and performing quantum computing.

Computer readable program instructions are typically loaded onto the computer 501 to cause a series of operational steps to be performed by the processor set 510 of the computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 521 and the other storage media discussed below. The program instructions, and associated data, are accessed by the processor set 510 to control and direct performance of the inventive methods. In the computing environment 500, at least some of the instructions for performing the inventive methods may be stored in the virtual meeting asset management code 600 in the persistent storage 513.

The communication fabric 511 is the signal conduction path that allows the various components of the computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 512 is any type of volatile memory now known or to be developed in the future. Examples include dynamic type random access memory (RAM) or static type RAM. Typically, the volatile memory 512 is characterized by random access, but this is not required unless affirmatively indicated. In the computer 501, the volatile memory 512 is located in a single package and is internal to the computer 501, but, alternatively or additionally, the volatile memory may be distributed over multiple packages and/or located externally with respect to the computer 501.

The persistent storage 513 is any form of non-volatile storage for computers that is now known or to be developed in the future. The non-volatility of this storage means that the stored data is maintained regardless of whether power is being supplied to the computer 501 and/or directly to the persistent storage 513. The persistent storage 513 may be a read only memory (ROM), but typically at least a portion of the persistent storage allows writing of data, deletion of data and re-writing of data. Some familiar forms of persistent storage include magnetic disks and solid state storage devices. The operating system 522 may take several forms, such as various known proprietary operating systems or open source Portable Operating System Interface-type operating systems that employ a kernel. The code included in the virtual meeting asset management code 600 typically includes at least some of the computer code involved in performing the inventive methods.

The peripheral device set 514 includes the set of peripheral devices of the computer 501. Data communication connections between the peripheral devices and the other components of the computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 523 may include components such as a display screen, speaker, microphone, wearable devices (such as goggles and smart watches), keyboard, mouse, printer, touchpad, game controllers, and haptic devices. The storage 524 is external storage, such as an external hard drive, or insertable storage, such as an SD card. The storage 524 may be persistent and/or volatile. In some embodiments, the storage 524 may take the form of a quantum computing storage device for storing data in the form of qubits. In embodiments where the computer 501 is required to have a large amount of storage (for example, where the computer 501 locally stores and manages a large database) then this storage may be provided by peripheral storage devices designed for storing very large amounts of data, such as a storage area network (SAN) that is shared by multiple, geographically distributed computers. The IoT sensor set 525 is made up of sensors that can be used in Internet of Things applications. For example, one sensor may be a thermometer and another sensor may be a motion detector.

The network module 515 is the collection of computer software, hardware, and firmware that allows the computer 501 to communicate with other computers through the WAN 502. The network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 515 are performed on the same physical hardware device. In other embodiments (for example, embodiments that utilize software-defined networking (SDN)), the control functions and the forwarding functions of the network module 515 are performed on physically separate devices, such that the control functions manage several different network hardware devices. Computer readable program instructions for performing the inventive methods can typically be downloaded to the computer 501 from an external computer or external storage device through a network adapter card or network interface included in the network module 515.

The WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 503 is any computer system that is used and controlled by an end user (for example, a customer of an enterprise that operates the computer 501), and may take any of the forms discussed above in connection with the computer 501. The EUD 503 typically receives helpful and useful data from the operations of the computer 501. For example, in a hypothetical case where the computer 501 is designed to provide a recommendation to an end user, this recommendation would typically be communicated from the network module 515 of the computer 501 through the WAN 502 to the EUD 503. In this way, the EUD 503 can display, or otherwise present, the recommendation to an end user. In some embodiments, the EUD 503 may be a client device, such as thin client, heavy client, mainframe computer, desktop computer and so on.

The remote server 504 is any computer system that serves at least some data and/or functionality to the computer 501. The remote server 504 may be controlled and used by the same entity that operates computer 501. The remote server 504 represents the machine(s) that collect and store helpful and useful data for use by other computers, such as the computer 501. For example, in a hypothetical case where the computer 501 is designed and programmed to provide a recommendation based on historical data, then this historical data may be provided to the computer 501 from the remote database 530 of the remote server 504.

The public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 505 is performed by the computer hardware and/or software of the cloud orchestration module 541. The computing resources provided by the public cloud 505 are typically implemented by virtual computing environments that run on various computers making up the computers of the host physical machine set 542, which is the universe of physical computers in and/or available to the public cloud 505. The virtual computing environments (VCEs) typically take the form of virtual machines from the virtual machine set 543 and/or containers from the container set 544. It is understood that these VCEs may be stored as images and may be transferred among and between the various physical machine hosts, either as images or after instantiation of the VCE. The cloud orchestration module 541 manages the transfer and storage of images, deploys new instantiations of VCEs and manages active instantiations of VCE deployments. The gateway 540 is the collection of computer software, hardware, and firmware that allows the public cloud 505 to communicate through the WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 506 is similar to the public cloud 505, except that the computing resources are only available for use by a single enterprise. While the private cloud 506 is depicted as being in communication with the WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 505 and the private cloud 506 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. In some embodiments, one or more of the operating system 522 and the virtual meeting asset management code 600 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:

responsive to receiving a notification that a virtual meeting is scheduled, initiating a collection of a set of communications, wherein the notification comprises characteristics associated with the upcoming virtual meeting, and wherein the characteristics comprise meeting start times, participant lists, meeting agenda with various presentation time slots per participant, and an application software type associated with a host of the virtual meeting;

monitoring and collecting communications between two or more users prior to the virtual meeting and during the virtual meeting;

receiving the set of communications associated with the upcoming virtual meeting;

analyzing, via natural language processing (NLP), the set of communications to identify one or more assets to be loaded for the upcoming virtual meeting;

generating a confidence score related to the analysis of the set of communications associated with assets requested for the virtual meeting, wherein the confidence score comprises a confidence value indicating confidence in using the assets requested for the virtual meeting on a computing device without interruption due to system health, hardware, and bandwidth;

adjusting the confidence score based on the collected communications between the two or more users during the virtual meeting, wherein the adjustment comprises:

determining, based on the analysis of the communication, specific conditions for user participation;

monitoring communications to identify if one or more of the determined conditions have been met; and loading the one or more assets on a computing device that will be presenting the one or more assets during the upcoming virtual meeting.

2. The computer-implemented method of claim 1, wherein the one or more assets are loaded automatically on the computing device when the upcoming virtual meeting initiates.

3. The computer-implemented method of claim 1, wherein the one or more assets are loaded automatically on the computing device at a predetermined time period prior to initiation of the virtual meeting.

4. The computer-implemented method of claim 1, further comprising:

determining that a first asset of the one or more assets is needed at a first predetermined time period after the virtual meeting initiates; and loading the first asset at the first predetermined time period after the virtual meeting initiates.

5. The computer-implemented method of claim 1, wherein at least one asset of the one or more assets loaded on the computing devices is automatically displayed on the computing device that is designated for screen sharing during the virtual meeting.

6. The computer-implemented method of claim 1, wherein the set of communications associated with the upcoming virtual meeting are identified prior to the receiving, wherein the identifying comprises:

receiving an identification of the upcoming virtual meeting;

receiving a set of characteristics of the upcoming virtual meeting; and analyzing a corpus of text to identify the set of communications associated with the identification of the upcoming virtual meeting and the set of characteristics of the upcoming virtual meeting.

7. The computer-implemented method of claim 1, wherein the set of communications comprises one or more communications type chosen from a group consisting of: email correspondence; text messages; direct messages; and calendar messages.

8. The computer-implemented method of claim 7, wherein the one or more assets comprises one or more asset types chosen from a group consisting of: software applications, computer models, documents, and files.

9. The computer-implemented method of claim 1, further comprising:

analyzing, using NLP, a second set of communications generated during the virtual meeting to identify a second asset to be loaded on a second computing device attending the virtual meeting; and loading the second asset on the second computing device.

10. The computer-implemented method of claim 1, further comprising:

analyzing, prior to loading the one or more assets, a performance state of the computing device;

generating, based on the analyzing, a performance state score for the computing device; and comparing the performance state score to a predetermined threshold, wherein if the predetermined threshold is met, the one or more assets are loaded on the computing device.

11. A system comprising: a processor; and a computer-readable storage medium communicatively coupled to the processor and storing program instructions which, when executed by the processor, cause the processor to perform a method comprising: responsive to receiving a notification that a virtual meeting is scheduled, initiating a collection of a set of communications, wherein the notification comprises characteristics associated with the upcoming virtual meeting, and wherein the characteristics comprise meeting start times, participant lists, meeting agenda with various presentation time slots per participant, and an application software type associated with a host of the virtual meeting; monitoring and collecting communications between two or more users prior to the virtual meeting and during the virtual meeting; receiving the set of communications associated with the upcoming virtual meeting; analyzing, via natural language processing (NLP), the set of communications to identify one or more assets to be loaded for the upcoming virtual meeting; generating a confidence score related to the analysis of the set of communications associated with assets requested for the virtual meeting, wherein the confidence score comprises a confidence value indicating confidence in using the assets requested for the virtual meeting on a computing device without interruption due to system health, hardware, and bandwidth; adjusting the confidence score based on the collected communications between the two or more users during the virtual meeting, wherein the adjustment comprises: determining, based on the analysis of the communication, specific conditions for user participation; monitoring communications to identify if one or more of the determined conditions have been met; and loading the one or more assets on a computing device that will be presenting the one or more assets during the upcoming virtual meeting.

12. The system of claim 11, wherein the one or more assets are loaded automatically on the computing device when the upcoming virtual meeting initiates.

13. The system of claim 11, wherein the one or more assets are loaded automatically on the computing device at a predetermined time period prior to initiation of the virtual meeting.

14. The system of claim 11, further comprising:

determining that a first asset of the one or more assets is needed at a first predetermined time period after the virtual meeting initiates; and loading the first asset at the first predetermined time period after the virtual meeting initiates.

15. The system of claim 11, wherein at least one asset of the one or more assets loaded on the computing devices is automatically displayed on the computing device that is designated for screen sharing during the virtual meeting.

16. A computer program product comprising a computer-readable storage medium having program instructions embodied therewith, the program instructions executable by a processor to cause the processor to perform a method comprising: responsive to receiving a notification that a virtual meeting is scheduled, initiating a collection of a set of communications, wherein the notification comprises characteristics associated with the upcoming virtual meeting, and wherein the characteristics comprise meeting start times, participant lists, meeting agenda with various presentation time slots per participant, and an application software type associated with a host of the virtual meeting; monitoring and collecting communications between two or more users prior to the virtual meeting and during the virtual meeting; receiving the set of communications associated with the upcoming virtual meeting; analyzing, via natural language processing (NLP), the set of communications to identify one or more assets to be loaded for the upcoming virtual meeting; generating a confidence score related to the analysis of the set of communications associated with assets requested for the virtual meeting, wherein the confidence score comprises a confidence value indicating confidence in using the assets requested for the virtual meeting on a computing device without interruption due to system health, hardware, and bandwidth; adjusting the confidence score based on the collected communications between the two or more users during the virtual meeting, wherein the adjustment comprises: determining, based on the analysis of the communication, specific conditions for user participation; monitoring communications to identify if one or more of the determined conditions have been met; and loading the one or more assets on a computing device that will be presenting the one or more assets during the upcoming virtual meeting.

17. The computer program product of claim 16, wherein the one or more assets are loaded automatically on the computing device when the upcoming virtual meeting initiates.

18. The computer program product of claim 16, wherein the one or more assets are loaded automatically on the computing device at a predetermined time period prior to initiation of the virtual meeting.

19. The computer program product of claim 16, further comprising:

determining that a first asset of the one or more assets is needed at a first predetermined time period after the virtual meeting initiates; and loading the first asset at the first predetermined time period after the virtual meeting initiates.

20. The computer program product of claim 16, wherein at least one asset of the one or more assets loaded on the computing devices is automatically displayed on the computing device that is designated for screen sharing during the virtual meeting.

* * * * *